United States Patent
Casoli et al.

Patent Number: 5,978,670
Date of Patent: *Nov. 2, 1999

[54] SYSTEM AND METHOD OF AUTOMATIC CALL BARRING IN A RADIO TELECOMMUNICATIONS NETWORK

[75] Inventors: Stefano Casoli, Dollard-des-Ormeaux, Canada; Allan Benjamin Ewart, Carrollton; David Spies, Garland, both of Tex.; Ghassan Assi, Pincourt, Canada

[73] Assignee: Telefonaktiebolaget LM Ericsson (publ), Stockholm, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/643,509

[22] Filed: May 6, 1996

[51] Int. Cl.$^6$ .................................................... H04Q 7/34
[52] U.S. Cl. ........................... 455/411; 455/433; 455/435
[58] Field of Search .............................. 379/189; 380/23; 455/410, 411, 432, 433, 435, 436

[56] References Cited

U.S. PATENT DOCUMENTS 4,955,049  9/1990  Ghisler ........................................ 379/58
5,335,265  8/1994  Cooper et al. .............................. 379/59

Primary Examiner—Wellington Chin
Assistant Examiner—Philip J. Sobatka
Attorney, Agent, or Firm—Smith & Danamraj, P.C.

[57] ABSTRACT

A system for reducing fraudulent use of a mobile telephone number in a radio telecommunications network. The system automatically bars call originations from the mobile telephone if the mobile telephone does not register with the network for a predetermined time period, or if the mobile telephone does not originate a call for a second predetermined time period. The system determines when a mobile telephone originates a call, measures a predetermined time period with a timing mechanism, and starts the timing mechanism when the mobile telephone originates a first call. The system then determines whether a second call originated from the mobile telephone during the predetermined time period and restarts the timing mechanism at the time that the mobile telephone originates a second call upon determining that the second call originated from the mobile telephone during the predetermined time period. The system reauthorizes the mobile telephone to originate calls in the network upon verification of a personal identification number entered by the subscriber.

28 Claims, 3 Drawing Sheets

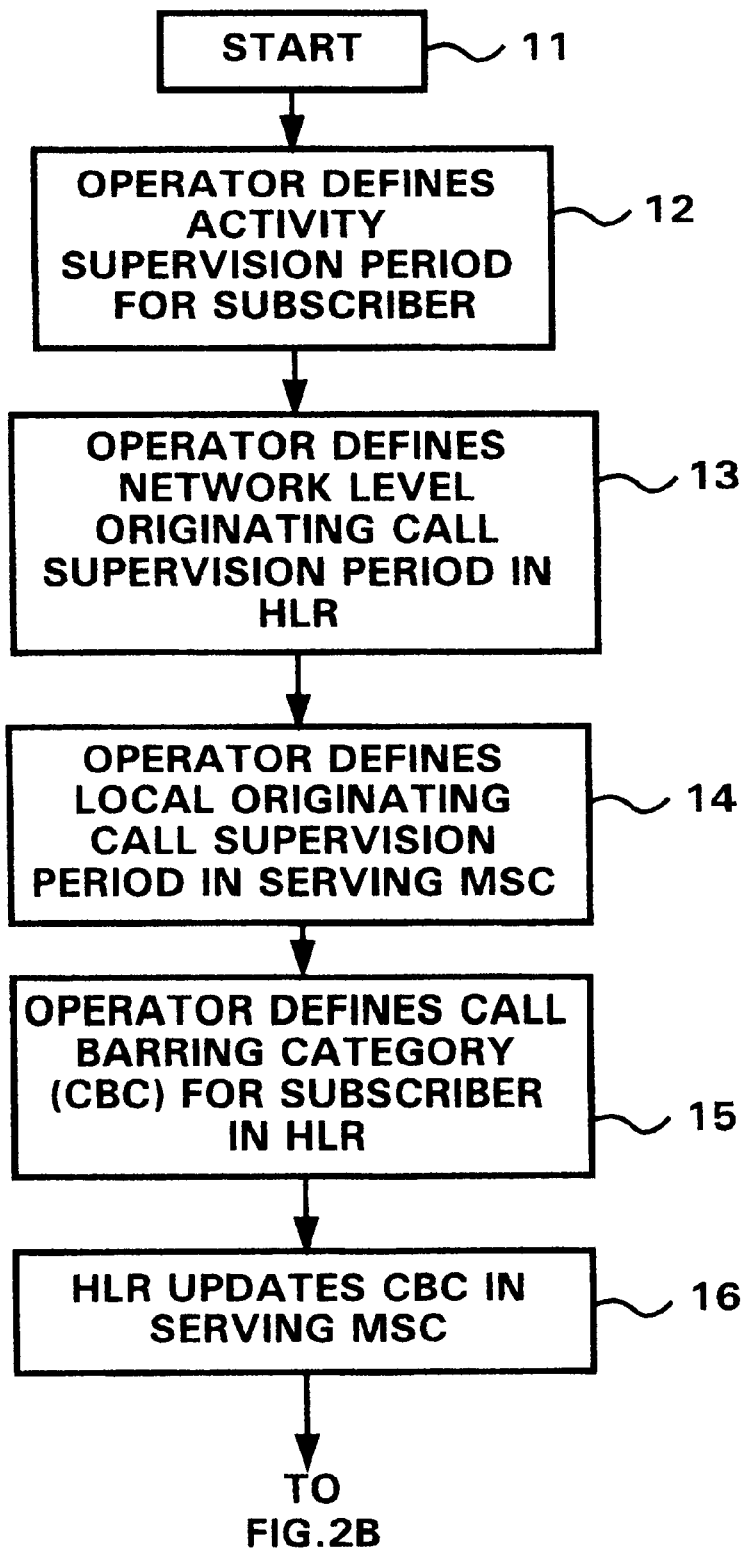

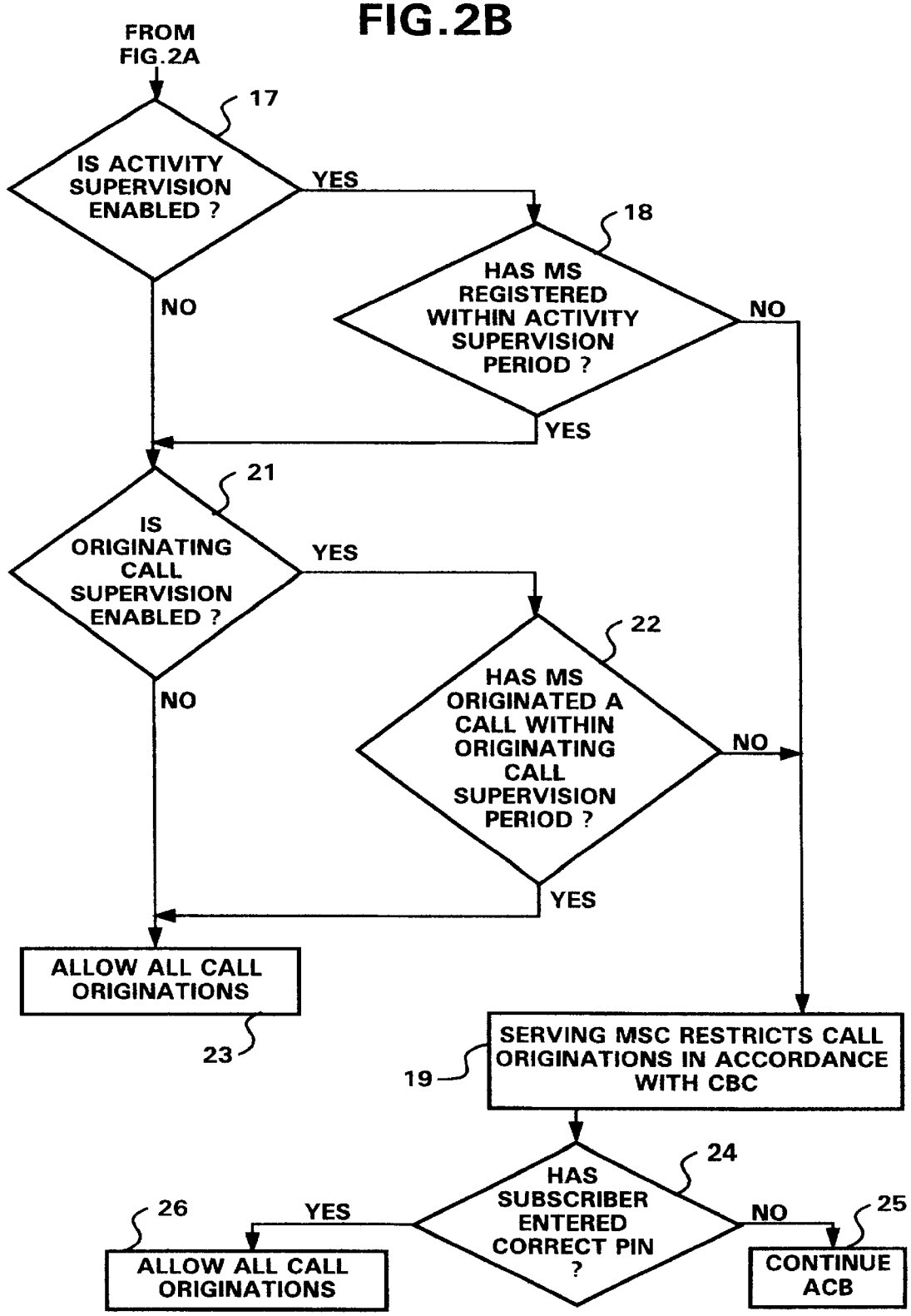

SYSTEM AND METHOD OF AUTOMATIC CALL BARRING IN A RADIO TELECOMMUNICATIONS NETWORK

BACKGROUND OF THE INVENTION

1. Technical Field of the Invention

This invention relates to radio telecommunication systems and, more particularly, to a system and method of fraud prevention by automatically barring calls originating from a mobile telephone upon the expiration of a predetermined time period.

2. Description of Related Art

Fraudulent use of mobile telephones in radio telecommunications networks is a serious problem. Fraudulent users may read the mobile identification number (MIN) and electronic serial number (ESN) from a legitimate subscriber's transmissions, and program that MIN and ESN into other telephones. The telecommunications network is unable to differentiate between call originations from the legitimate subscriber and the fraudulent users who are utilizing the same MIN and ESN. Therefore, the legitimate subscriber may be billed for the fraudulent usage.

Existing cellular telephone networks utilize a process known as Code Controlled Barring (CCB) to help prevent fraud. When utilizing CCB, if a mobile subscriber knows that he will not be utilizing his mobile telephone for an extended period of time, the subscriber enters a personal identification number (PIN), and thereafter, the operator denies access to the network to any mobile telephone with the MIN and ESN of the subscriber's telephone. At a later time, the subscriber may re-enter his PIN to reactivate his network access.

A problem with this solution is that the subscriber must remember to enter the PIN and bar his telephone whenever the subscriber anticipates that he will not use the telephone for an extended period. This is a burdensome inconvenience to the legitimate subscriber. In addition, subscribers often forget to bar their telephones because of other priorities. Therefore, fraudulent users often have extended periods in which they may operate with stolen MINs and ESNs before the fraud is discovered.

Although there are no known prior art teachings of a solution to the aforementioned deficiency and shortcoming such as that disclosed herein several references discuss subject matter that bears some relation to matters discussed herein. U.S. Pat. No. 4,955,049 to Ghisler discloses a method of supervising subscribers in a mobile telephone system to detect fraudulent use of a mobile telephone. Ghisler assigns a predetermined sequence of numbers to each mobile telephone in the system. When a call is made by a legitimate subscriber, the sequence number is recorded in the MSC. If the next call from a mobile telephone with the same MIN and ESN does not include the next number in the assigned sequence, the call is barred.

A disadvantage of Ghisler, however, is that every mobile telephone in the system must be programmed with a different sequence of numbers. This is an expensive and burdensome process which may not be possible to implement in existing telephones already in the field. Additionally, the MSC must be programmed with the sequences of every mobile telephone in the system, thereby utilizing valuable data processing resources.

U.S. Pat. No. 5,335,265 to Cooper et al. discloses an apparatus for preventing subscriber number cloning by discerning temporal and spatial anomalies in the use of subscriber numbers in a cellular telephone system. If two successive calls from a particular subscriber number are detected in a time interval that is too short to justify the geographical separation of the subscriber unit for the two calls, then the Cooper apparatus determines that one of the calls is fraudulent.

The Cooper apparatus, however, does not detect any fraudulent usage if the fraudulent user is not geographically separated from the legitimate user in a time period too short to account for this movement. In addition, Cooper does not identify which call is fraudulent, only that one of the two calls may be fraudulent. An extensive verification system requiring additional intersystem signaling must also be implemented.

Review of each of the foregoing references reveals no disclosure or suggestion of a system or method such as that described and claimed herein.

In order to overcome the disadvantage of existing solutions, it would be advantageous to have a system and method of automatically barring a mobile telephone from originating calls if the mobile telephone does not originate any calls within a predetermined time period. The present invention provides such a system and method.

SUMMARY OF THE INVENTION

In one aspect, the present invention is a system for reducing the instances of fraudulent use of a mobile telephone number in a radio telecommunications network. The system automatically bars the mobile telephone from originating calls if the mobile telephone does not originate any calls within a predetermined time period. Entry of a subscriber's personal identification number (PIN) reactivates the mobile telephone's access to the network.

In another aspect, the present invention is a system for reducing fraudulent use of a mobile identification number associated with a mobile station in a radio telecommunications network. The system includes a timer for measuring an activity supervision period and means for restricting call originations from the mobile station if the mobile station does not register with the network within the activity supervision period.

In particular, the present invention comprises means for determining when a mobile telephone originates a call, a timing mechanism that measures a predetermined time period, and means for starting the timing mechanism when the mobile telephone originates a first call. The system also includes means for determining whether a second call originated from the mobile telephone during the predetermined time period and means for restarting the timing mechanism at the time that the mobile telephone originates a second call upon determining that the second call originated from the mobile telephone during the predetermined time period. Finally, the system includes means for barring the mobile telephone from originating calls in the network upon determining that no calls originated from the mobile telephone during the predetermined time period.

In another aspect, the present invention is a method of reducing the instances of fraudulent use of a mobile telephone number in a radio telecommunications network by establishing a predetermined time period beginning when the mobile telephone originates a call and automatically barring the mobile telephone from originating calls if the mobile telephone does not originate any additional calls before the expiration of the predetermined time period. The method also includes reactivating the mobile telephone's access to the network upon entry of a subscriber's personal identification number (PIN).

In particular, the method comprises the steps of determining when a mobile telephone originates a call, measuring a predetermined time period with a timing mechanism, and starting the timing mechanism when the mobile telephone originates a first call. The method then determines whether a second call originated from the mobile telephone during the predetermined time period and restarts the timing mechanism at the time that the mobile telephone originates a second call upon determining that the second call originated from the mobile telephone during the predetermined time period. Finally, the method includes the step of barring the mobile telephone from originating calls in the network upon determining that no calls originated from the mobile telephone during the predetermined time period.

BRIEF DESCRIPTION OF THE DRAWINGS

The invention will be better understood and its numerous objects and advantages will become more apparent to those skilled in the art by reference to the following drawing, in conjunction with the accompanying specification, in which:

FIGS. 2A and 2B are a flow chart illustrating the steps performed by the preferred embodiment of the present invention when automatic call barring is implemented in a radio telecommunications network.

DETAILED DESCRIPTION OF EMBODIMENTS

Figure 1:
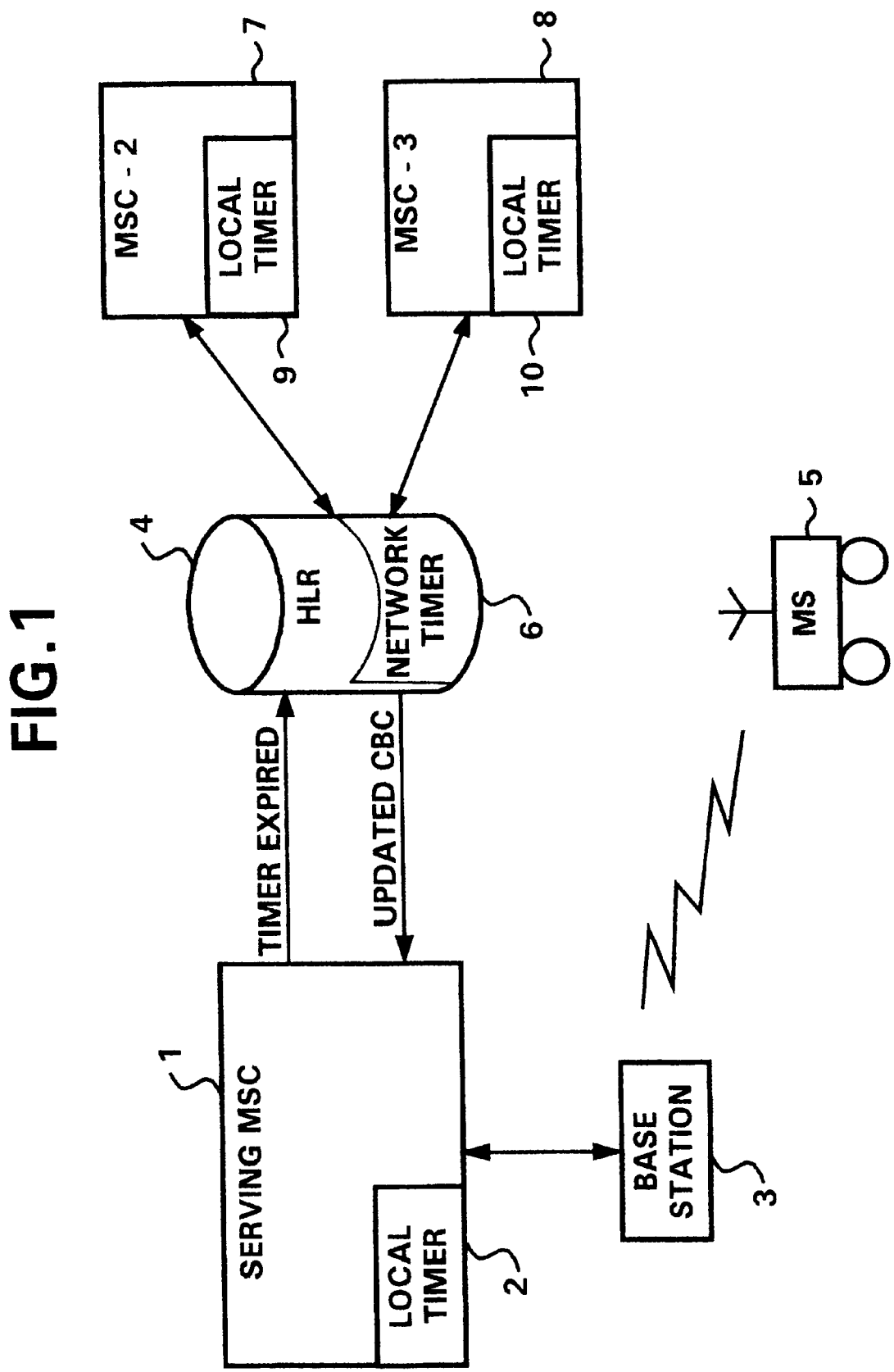
FIG. 1 is a simplified block diagram of a portion of a radio telecommunications network which has been modified in accordance with the present invention.

The present invention is a system and method of automatic call barring (ACB) to reduce instances of fraudulent mobile telephone usage. When utilizing ACB, cellular network operators determine a time period ($\Delta t$) during which any registered mobile telephone (mobile station) must make an access to the network. If no calls originate from a particular mobile station during the at time period, the mobile station automatically bars itself from its associated home location register (HLR) in the cellular network. Any further access utilizing that mobile station's MIN and ESN is denied. An originating call, in this context, is defined as a call from the registered mobile station to another telephone subscriber, or a service call or an enquiry call from the registered mobile station. To reactivate access to the network, the mobile subscriber enters a personal identification number (PIN). Optionally, the ACB system may send a data message to the subscriber notifying him on the mobile station display that entry of a PIN is required to reactive his access.

Two methods of defining the amount of time before ACB is invoked are referred to as activity supervision and originating call supervision. An activity supervision timer expires when a mobile station is determined to be inactive for a predetermined period of time, $\Delta t_1$. For example, the timer may expire when the mobile station misses a periodic registration. If a mobile subscriber turns his mobile station OFF for a period exceeding the $\Delta t_1$ time period, the subscriber must enter his PIN upon turning his mobile station ON, before he can originate a call. Likewise, if the mobile subscriber turns his mobile station ON, but does not originate any calls for a period exceeding the At time period (i.e., the mobile station is in the STANDBY mode), the subscriber must enter his PIN before he can originate a call.

A network level originating call supervision timer expires if no call is attempted in a predetermined period of time $\Delta t_2$, for example 15 minutes after the last registration. Subscription options enable activation of ACB, and the barring of outgoing calls when either timer, or both, expires. At all times, however, calls to the operator, emergency calls to 911, and ACB deactivation calls are allowed. Additionally, the expiration of the $\Delta t_1$ or $\Delta t_2$ time periods does not prevent the mobile station from receiving calls, as long as the mobile station registers periodically with the controlling network (normally every 15–20 minutes) when in the STANDBY mode. In the preferred embodiment, however, receiving a call does not unbar the mobile station. The subscriber must still enter a PIN in order to originate a call.

ACB allows the operator to adjust the length of the $\Delta t_1$ or $\Delta t_2$ time periods for different subscribers, or to activate ACB only for selected subscribers who may have a higher risk of fraudulent usage. Subscribers such as, for example taxicab drivers, may have a higher risk of fraudulent usage because it is well known to fraudulent users that some taxicabs have mobile telephones installed for the use of passengers who are then charged by the driver for telephone calls. Fraudulent users may drive near the taxicab until the mobile telephone is utilized and the fraudulent users obtain the telephone's MIN and ESN. High risk subscribers may be assigned a shorter at time period, thereby reducing the time period during which fraudulent usage may occur and making fraudulent usage more difficult. However, subscribers who have never experienced any fraudulent usage may find it inconvenient to have a shorter $\Delta t$ time period since they may have to enter their PIN more often in order to originate calls. Therefore, they may be assigned longer $\Delta t$ time periods, or may not subscribe to ACB at all.

ACB may be offered as an additional service in networks that currently utilize Code Controlled Barring to reduce fraudulent usage. A mobile station barred by ACB can only originate certain types of calls as are predefined by the subscription to ACB. These types of calls may differ from the basic ACB subscription.

FIG. 1 is a simplified block diagram of a portion of a radio telecommunications network which has been modified in accordance with the present invention. A serving mobile switching center (MSC) 1 includes a local activity supervision timer 2 and communicates with a radio base station 3. A home location register (HLR) 4 is associated with a mobile station (MS) 5, and includes a network level activity supervision timer 6. Other MSCs, for example MSC-2 (7) and MSC-3 (8) may be associated with HLR 4, and may be equipped with local activity supervision timers 9 and 10, respectively.

ACB is controlled at two points in the cellular network, the mobile switching center where the mobile station is operating (serving MSC 1) and at the HLR 4 associated with the mobile station 5. If a particular mobile station has not registered for a given period of time, for example 15 minutes, the serving MSC 1 sends this information to the HLR associated with the mobile station. The HLR 4 then sets the call barring category (CBC) of the mobile station to a level determined by the network operator (e.g., no long distance calls allowed, no access at all, etc.). The HLR 4 then updates the CBC of the subscriber in the serving MSC 1. Thereafter, if a telephone with that mobile station's MIN and ESN attempts to place a call, the call is restricted in accordance with the CBC set in the serving MSC. The network level originating call supervision period $\Delta t_2$ may be specified by the operator as a default value in the HLR 4. In addition, the operator may define a local originating call supervision period $\Delta t_3$ in each MSC.

Both the network level and local originating call supervision timers are reset upon every non-barred call attempt by the ACB subscriber. The timer expiration period is operator-configurable exchange data. Statistics are maintained in the serving MSC 1 on:

a. The cumulative number of barred call attempts (maximum 65,000) for all subscribers in the serving MSC;

b. The number of barred call attempts for an individual subscriber in the serving MSC;

c. The cumulative number of ACB activations (maximum 65,000) for all subscribers in the HLR; and d. The number of ACB activations for an individual subscriber in the HLR.

If the number of barred call attempts for an individual subscriber in the serving MSC 1 exceeds a predetermined threshold, the subscriber may optionally be permanently barred until a more thorough investigation is performed to determine whether the subscriber has become a target of fraudulent users. In such a case, if the subscriber enters his PIN, he will not gain access, but will receive an announcement stating that the number of barred call attempts for the subscriber has exceeded the system's threshold. The subscriber may be requested to call the operator for further assistance.

The ACB feature is available to inter-exchange (IS-41) roamers as well as subscribers within their home exchange.

The ACB feature also addresses a related form of fraud. Some otherwise legitimate subscribers have learned that they can deny a certain percentage of their calls by falsely claiming that they were the target of fraudulent users. In most cases, the operator removes the charges because the operator has no way of knowing whether the subscriber was actually the target of fraud since the incidence of actual fraud has so greatly increased. An ACB subscriber could not falsely deny many calls.

FIGS. 2A and 2B are a flow chart illustrating the steps performed by the preferred embodiment of the present invention when automatic call barring is implemented in a radio telecommunications network. Referring first to FIG. 2A, the process begins at step 11 and moves to step 12 where an operator defines the activity supervision period $\Delta t_1$ for a subscriber. At step 13, the operator defines a network level originating call supervision period $\Delta t_2$ in the subscriber's HLR. At step 14, the operator defines a local originating call supervision period $\Delta t_3$ in the serving MSC. At step 15, the operator defines a Call Barring Category (CBC) for the subscriber in the HLR, and the HLR updates the CBC of the subscriber in the serving MSC at step 16.

The process then moves to FIG. 2B, step 17 where it is determined whether or not the activity supervision feature is enabled for a mobile subscriber attempting to originate a call. If activity supervision is enabled, the process moves to step 18 where it is determined whether or not the mobile station has registered within the activity supervision period $\Delta t_1$. If not, the process moves to step 19 where the serving MSC implements ACB by restricting call originations in accordance with the call barring category.

If, however, at step 17 it is determined that activity supervision is not enabled, or at step 18 it is determined that the mobile station has registered within the activity supervision period, then the process moves to step 21. At step 21, it is determined whether or not the originating call supervision feature is enabled. If originating call supervision is enabled, the process moves to step 22 where it is determined whether or not the mobile station has originated a call within the originating call supervision period (either $\Delta t_2$ at the network level or $\Delta t_3$ at the local serving MSC level). If not, the process moves to step 19 where the serving MSC implements ACB by restricting call originations in accordance with the call barring category.

If, however, at step 21 it is determined that originating call supervision is not enabled, or at step 22 it is determined that the mobile station has originated a call within the originating call supervision period, then the process moves to step 23 where the serving MSC allows all call originations from the mobile station.

Following the implementation of ACB at step 19, the process moves to step 24 where it is determined whether the subscriber has entered the correct PIN to deactivate ACB. If the subscriber has not entered the correct PIN, the process continues ACB at step 25 and restricts call originations according to the CBC. If, however, the subscriber enters the correct PIN, then the process moves from step 24 to step 26 where the serving MSC allows all call originations from the mobile station.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A method of reducing fraudulent use of a mobile identification number associated with a mobile station in a radio telecommunications network by making an initial determination to restrict the mobile station's access to the network, said method comprising the steps of:

assigning a first threshold value to an activity supervision period measured by a network timer located in a Home Location Register (HLR) associated with the mobile station, said first threshold value being a maximum time that the mobile station may be inactive; and making the initial determination, before the mobile station is disabled by said network, to restrict call originations from the mobile station if the mobile station does not register with said network within the activity supervision period.

2. The method of reducing fraudulent use of a mobile identification number of claim 1 further comprising the steps of:

enabling a subscriber to enter a personal identification number (PIN) through said mobile station;

determining whether said entered PIN is correct; and reauthorizing said mobile station to originate calls in said network upon determining that said entered PIN is correct.

3. The method of reducing fraudulent use of a mobile identification number of claim 2 wherein said step of restricting call originations from the mobile station includes barring said mobile station from originating calls in a first category while authorizing said mobile station to originate calls in a second category.

4. The method of reducing fraudulent use of a mobile identification number of claim 3 wherein said step of barring said mobile station from originating calls in a first category while authorizing said mobile station to originate calls in a second category includes setting a call barring category (CBC) of the mobile station to a level determined by a network operator.

5. The method of reducing fraudulent use of a mobile identification number of claim 1 further comprising the steps of:

assigning a second threshold value to an originating call supervision period measured by a local timer located in a serving Mobile Switching Center (MSC) associated with the mobile station, said second threshold value being a maximum time period following a registration by the mobile station during which the mobile station must originate a call, wherein said step of making the initial determination, before the mobile station is disabled by said network, includes the step of deciding to restrict call originations from the mobile station if the mobile station does not originate a call within the originating call supervision period.

6. The method of reducing fraudulent use of a mobile identification number of claim 5 further comprising the steps of:

enabling a subscriber to enter a personal identification number (PIN) through said mobile station;

determining whether said entered PIN is correct; and reauthorizing said mobile station to originate calls in said network upon determining that said entered PIN is correct.

7. A method of reducing fraudulent use of a mobile identification number associated with a mobile station in a radio telecommunications network by making an initial determination to restrict the mobile station's access to the network, said method comprising the steps of:

assigning a threshold value to an originating call supervision period measured by a timer located in at least one of a Home Location Register (HLR) and a serving Mobile Switching Center (MSC) associated with said network, said threshold value being a maximum time period following a registration by the mobile station during which the mobile station must originate a call; and making the initial determination, before the mobile station is disabled by said network, to restrict call originations from the mobile station if the mobile station does not originate a call within the originating call supervision period.

8. The method of reducing fraudulent use of a mobile identification number of claim 7 further comprising the steps of:

enabling a subscriber to enter a personal identification number (PIN) through said mobile station;

determining whether said entered PIN is correct; and reauthorizing said mobile station to originate calls in said network upon determining that said entered PIN is correct.

9. The method of reducing fraudulent use of a mobile identification number of claim 8 wherein said step of restricting call originations from the mobile station includes barring said mobile station from originating calls in a first category while authorizing said mobile station to originate calls in a second category.

10. The method of reducing fraudulent use of a mobile identification number of claim 9 wherein said step of barring said mobile station from originating calls in a first category while authorizing said mobile station to originate calls in a second category includes setting a call barring category (CBC) of the mobile station to a level determined by a network operator.

11. A system for reducing fraudulent use of a mobile identification number associated with a mobile station in a radio telecommunications network by making an initial determination to restrict the mobile station's access to the network, said system comprising:

a timer incorporated in a Home Location Register (HLR) associated with the mobile station, said timer for measuring an activity supervision period, said activity supervision period being a pre-determined maximum time that the mobile station may be inactive; and means for making the initial determination, before the mobile station is disabled by said network, to restrict call originations from the mobile station if the mobile station does not register with said network within the activity supervision period.

12. The system for reducing fraudulent use of a mobile identification number of claim 11 further comprising:

means for enabling a subscriber to enter a personal identification number (PIN) through said mobile station;

means for determining whether said entered PIN is correct; and means for reauthorizing said mobile station to originate calls in said network upon determining that said entered PIN is correct.

13. The system for reducing fraudulent use of a mobile identification number of claim 12 wherein said means for restricting call originations from the mobile station includes means for barring said mobile station from originating calls in a first category while authorizing said mobile station to originate calls in a second category.

14. The system for reducing fraudulent use of a mobile identification number of claim 13 wherein said means for barring said mobile station from originating calls in a first category while authorizing said mobile station to originate calls in a second category includes means for setting a call barring category (CBC) of the mobile station to a level determined by a network operator.

15. The system for reducing fraudulent use of a mobile identification number of claim 11 further comprising:

a timer for measuring an originating call supervision period; and means for restricting call originations from the mobile station if the mobile station does not originate a call within the originating call supervision period.

16. The system for reducing fraudulent use of a mobile identification number of claim 15 further comprising:

means for enabling a subscriber to enter a personal identification number (PIN) through said mobile station;

means for determining whether said entered PIN is correct; and means for reauthorizing said mobile station to originate calls in said network upon determining that said entered PIN is correct.

17. A system for reducing fraudulent use of a mobile identification number associated with a mobile station in a radio telecommunications network by making an initial determination to restrict the mobile station's access to the network, said system comprising:

a timer incorporated in at least one of a Home Location Register (HLR) and a serving Mobile Switching Center (MSC) associated with the mobile station, said timer for measuring an originating call supervision period, said originating call supervision period being a pre-determined maximum time period following a registration by the mobile station during which the mobile station must originate a call; and means for making the initial determination, before the mobile station is disabled by said network, to restrict call originations from the mobile station if the mobile station does not originate a call within the originating call supervision period.

18. The system for reducing fraudulent use of a mobile identification number of claim 17 further comprising:

means for enabling a subscriber to enter a personal identification number (PIN) through said mobile station;

means for determining whether said entered PIN is correct; and means for reauthorizing said mobile station to originate calls in said network upon determining that said entered PIN is correct.

19. The system for reducing fraudulent use of a mobile identification number of claim 18 wherein said means for restricting call originations from the mobile station includes means for barring said mobile station from originating calls in a first category while authorizing said mobile station to originate calls in a second category.

20. The system for reducing fraudulent use of a mobile identification number of claim 19 wherein said means for barring said mobile station from originating calls in a first category while authorizing said mobile station to originate calls in a second category includes means for setting a call barring category (CBC) of the mobile station to a level determined by a network operator.

21. A system for reducing fraudulent use of a mobile telephone number in a radio telecommunications network serving a plurality of mobile telephones by making an initial determination to deny one of the mobile telephones access to the network, said system comprising:

means for determining when a mobile telephone originates a call;

a timing mechanism that measures a predetermined time period, said timing mechanism incorporated in at least one of a Home Location Register (HLR) and a serving Mobile Switching Center (MSC) associated with the mobile station;

means for starting said timing mechanism when said mobile telephone originates a first call;

means for determining whether a second call originated from said mobile telephone during said predetermined time period;

means for restarting said timing mechanism at the time that said mobile telephone originates a second call upon determining that said second call originated from said mobile telephone during said predetermined time period; and means for barring said mobile telephone from originating calls in said network while allowing others of said plurality of mobile telephones to continue originating calls, upon determining that no calls originated from said mobile telephone during said predetermined time period.

22. The system for reducing fraudulent use of a mobile telephone number of claim 21 further comprising:

means for entering a subscriber's personal identification number (PIN);

means for verifying said PIN; and means for reauthorizing said mobile telephone to originate calls in said network.

23. The system for reducing fraudulent use of a mobile telephone number of claim 22 wherein said means for barring said mobile telephone from originating calls in said network includes means for barring said mobile telephone from originating calls in a first category while authorizing said mobile telephone to originate calls in a second category.

24. The system for reducing fraudulent use of a mobile telephone number of claim 23 wherein said means for barring said mobile telephone from originating calls in a first category while authorizing said mobile telephone to originate calls in a second category includes means for setting a call barring category (CBC) of the mobile telephone to a level determined by a network operator.

25. A method of reducing fraudulent use of a mobile telephone number in a radio telecommunications network serving a plurality of mobile telephones by making an initial determination to deny one of the mobile telephones access to the network, said method comprising the steps of:

determining when a mobile telephone originates a call;

measuring a predetermined time period with a timing mechanism, said timing mechanism incorporated in at least one of a Home Location Register (HLR) and a serving Mobile Switching Center (MSC) associated with the mobile station;

starting said timing mechanism when said mobile telephone originates a first call;

determining whether a second call originated from said mobile telephone during said predetermined time period;

restarting said timing mechanism at the time that said mobile telephone originates a second call upon determining that said second call originated from said mobile telephone during said predetermined time period; and barring said mobile telephone from originating calls in said network while allowing others of said plurality of mobile telephones to continue originating calls, upon determining that no calls originated from said mobile telephone during said predetermined time period.

26. The method of reducing fraudulent use of a mobile telephone number of claim 25 further comprising the steps of:

enabling a subscriber to enter a personal identification number (PIN);

verifying said PIN; and reauthorizing said mobile telephone to originate calls in said network.

27. The method of reducing fraudulent use of a mobile telephone number of claim 26 wherein said step of barring said mobile telephone from originating calls in said network includes barring said mobile telephone from originating calls in a first category while authorizing said mobile telephone to originate calls in a second category.

28. The method of reducing fraudulent use of a mobile telephone number of claim 27 wherein said step of barring said mobile telephone from originating calls in a first category while authorizing said mobile telephone to originate calls in a second category includes setting a call barring category (CBC) of the mobile telephone to a level determined by a network operator.

* * * * *